US012340739B2

(12) United States Patent
Zheng et al.

(10) Patent No.: US 12,340,739 B2
(45) Date of Patent: Jun. 24, 2025

(54) DISPLAY PANEL, METHOD FOR DRIVING THE SAME, AND DISPLAY DEVICE

(71) Applicant: WUHAN TIANMA MICRO-ELECTRONICS CO., LTD., Wuhan (CN)

(72) Inventors: Tianchun Zheng, Wuhan (CN); Jiao Wu, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/366,923

(22) Filed: Aug. 8, 2023

(65) Prior Publication Data

US 2023/0410734 A1 Dec. 21, 2023

(30) Foreign Application Priority Data

May 11, 2023 (CN) ......................... 202310532215.7

(51) Int. Cl.
*G09G 3/3225* (2016.01)

(52) U.S. Cl.
CPC ....... *G09G 3/3225* (2013.01); *G09G 2310/08* (2013.01); *G09G 2320/0247* (2013.01); *G09G 2320/046* (2013.01); *G09G 2320/0626* (2013.01)

(58) Field of Classification Search
CPC ............. G09G 3/3225; G09G 2310/08; G09G 2320/0247; G09G 2320/046; G09G 2320/0626
See application file for complete search history.

(56) References Cited

U.S. PATENT DOCUMENTS

| | | | | |
|---|---|---|---|---|
| 10,964,262 | B1 * | 3/2021 | Lin | G09G 3/2022 |
| 11,037,523 | B2 * | 6/2021 | Hei | G09G 5/02 |
| 11,189,227 | B1 * | 11/2021 | Zhang | G09G 3/3233 |
| 11,580,898 | B1 * | 2/2023 | Huang | G09G 3/32 |
| 2015/0035448 | A1 * | 2/2015 | Wang | G09G 3/3291 315/240 |
| 2017/0221445 | A1 * | 8/2017 | Wu | G09G 3/3696 |

(Continued)

FOREIGN PATENT DOCUMENTS

CN 112669741 A 4/2021

*Primary Examiner* — Ariel A Balaoing

(74) *Attorney, Agent, or Firm* — CHRISTENSEN O'CONNOR JOHNSON KINDNESS PLLC

(57) ABSTRACT

A display panel includes a light-emitting element and a pixel circuit electrically connected to each other. In an embodiment, at least one light-emitting phase of the pixel circuit each includes n light-emitting sub-phases, and the pixel circuit is configured to transmit a light-emitting signal to the light-emitting element in at least one of the n light-emitting sub-phases. In an embodiment, a duration ti of transmitting the light-emitting signal to the light-emitting element by the pixel circuit in the $i^{th}$ light-emitting sub-phase of the n light-emitting sub-phases is smaller than a duration tj of transmitting the light-emitting signal to the light-emitting element by the pixel circuit in the $j^{th}$ light-emitting sub-phase of the n light-emitting sub-phases, where 0<ti, 0<tj, 1≤i≤n, 1≤j≤n, and i≠j.

18 Claims, 7 Drawing Sheets

(56) References Cited

U.S. PATENT DOCUMENTS

| | | | | |
|---|---|---|---|---|
| 2020/0302859 | A1* | 9/2020 | Wang | G09G 3/3233 |
| 2021/0183290 | A1* | 6/2021 | Sato | G09G 3/20 |
| 2023/0031984 | A1* | 2/2023 | Wang | G09G 3/3233 |
| 2024/0169922 | A1* | 5/2024 | Chen | G09G 3/3233 |
| 2024/0257733 | A1* | 8/2024 | Huang | G09G 3/2007 |
| 2024/0282261 | A1* | 8/2024 | Li | G09G 3/3291 |

* cited by examiner

DISPLAY PANEL, METHOD FOR DRIVING THE SAME, AND DISPLAY DEVICE

CROSS-REFERENCE TO RELATED APPLICATIONS

The present application claims priority to Chinese Patent Application No. 202310532215.7, filed on May 11, 2023, the content of which is incorporated herein by reference in its entirety.

TECHNICAL FIELD

The present disclosure relates to the technical field of display, and in particular, to a display panel, a method for driving a display panel, and a display device.

BACKGROUND

At present, display panels are widely used in various display scenarios. Active-Matrix Organic Light-Emitting Diode (AMOLED) display panels can reduce a screen burn problem of Organic Light-Emitting Diode (OLED) display panels, and thus are widely used.

Conventional display panels are driven by a pixel circuit. The pixel circuit has a leakage current of about $10^{-12}$ A, causing inconsistent brightness in light-emitting sub-phases of a same light-emitting phase. A person with sensitive vision may easily recognize flickering. Long time use of this type of display panel is harmful to eyes. Therefore, the flickering problem of the display panel in a low-frequency display mode, especially the flickering problem of the AMOLED display panel in the low-frequency display mode, needs to be solved urgently.

SUMMARY

In a first aspect, the present disclosure provides a display panel. In an embodiment, the display panel includes: a pixel circuit; and a light-emitting element electrically connected to the pixel circuit. In an embodiment, at least one light-emitting phase of the light-emitting element includes n light-emitting sub-phases, and the pixel circuit is configured to transmit a light-emitting signal to the light-emitting element during the n light-emitting sub-phases. In an embodiment, a duration ti of transmitting the light-emitting signal to the light-emitting element by the pixel circuit in an $i^{th}$ light-emitting sub-phase of the n light-emitting sub-phases is smaller than a duration tj of transmitting the light-emitting signal to the light-emitting element by the pixel circuit in a $j^{th}$ light-emitting sub-phase of the n light-emitting sub-phases, where $0<ti$, $0<tj$, $1\le i\le n$, $1\le j\le n$, and $i\ne j$.

In a second aspect, the present disclosure provides a method for driving a display panel of the first aspect. In an embodiment, the method includes: acquiring a target display mode of the display panel, and determining, according to the target display mode, a total duration of transmitting a light-emitting signal to the light-emitting element by the pixel circuit in a light-emitting phase and a number of light-emitting sub-phases in the light-emitting phase; determining an average duration of transmitting the light-emitting signal to the light-emitting element by the pixel circuit in all light-emitting sub-phases of the light-emitting phase according to a ratio of the total duration of transmitting the light-emitting signal to the light-emitting element by the pixel circuit in the light-emitting phase to the number of the light-emitting sub-phases in the light-emitting phase; and maintaining the duration of transmitting the light-emitting signal to the light-emitting element by the pixel circuit in the first light-emitting sub-phase of the light-emitting sub-phases unchanged, and adjusting the durations of transmitting the light-emitting signal to the light-emitting element by the pixel circuit in other light-emitting sub-phases so that brightness of the light-emitting element in any two light-emitting sub-phases of the light-emitting sub-phases corresponds to a flicker value smaller than or equal to a preset value.

In a third aspect, the present disclosure provides a display device. In an embodiment, the display device includes a display panel of the first aspect.

In embodiments of the present disclosure, a duration ti of transmitting the light-emitting signal to the light-emitting element by the pixel circuit in the $i^{th}$ light-emitting sub-phase of the n light-emitting sub-phases is smaller than a duration tj of transmitting the light-emitting signal to the light-emitting element by the pixel circuit in the $j^{th}$ light-emitting sub-phase of the n light-emitting sub-phases, where $0<ti$, $0<tj$, $1\le i\le n$, $1\le j\le n$, and $i\ne j$. In an embodiment, as a result, at least part of the light-emitting sub-phases in one light-emitting phase are different in light-emitting duration. In an embodiment, the brightness reduction of some light-emitting sub-phases caused by the leakage current of the pixel circuit is compensated. In an embodiment, the brightness difference between light-emitting sub-phases is reduced, and the flicker problem is effectively alleviated. In an embodiment, in the method for acquiring the driving of a display panel, the duration of transmitting the light-emitting signal to the light-emitting element by the pixel circuit in the first light-emitting sub-phase is not changed, the duration of transmitting the light-emitting signal to the light-emitting element by the pixel circuit in other light-emitting sub-phases may be adjusted, the power consumption is reduced while addressing the flicker problem.

BRIEF DESCRIPTION OF DRAWINGS

In order to more clearly illustrate technical solutions of embodiments of the present disclosure, the drawings to be used in the embodiments will be briefly described below. The drawings in the following description are some embodiments of the present disclosure. For those skilled in the art, other drawings may also be obtained based on these drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms “a”, “an”, “the” and “said” in a singular form in the embodiment of the present disclosure and the attached claims are also intended to include plural forms thereof, unless noted otherwise.

It should be understood that the term “and/or” used in the context of the present disclosure is to describe a correlation relation of related objects, indicating that there may be three relations, e.g., A and/or B may indicate only A, both A and B, and only B. In addition, the symbol “/” in the context generally indicates that the relation between the objects in front and at the back of “/” is an “or” relationship.

In the description of the present specification, it should be understood that the terms such as “substantially”, “approximate to”, “approximately”, “about”, “roughly”, and “in general” described in the claims and embodiments of the present disclosure mean general agreement within a reasonable process operation range or tolerance range, rather than an exact value.

It should be understood that although the terms ‘first’, ‘second’ and ‘third’ may be used in the present disclosure to describe regions, these regions should not be limited to these terms. These terms are used only to distinguish the regions from each other. For example, without departing from the scope of the embodiments of the present disclosure, a first region may also be referred to as a second region. Similarly, the second region may also be referred to as the first region.

Figure 1:
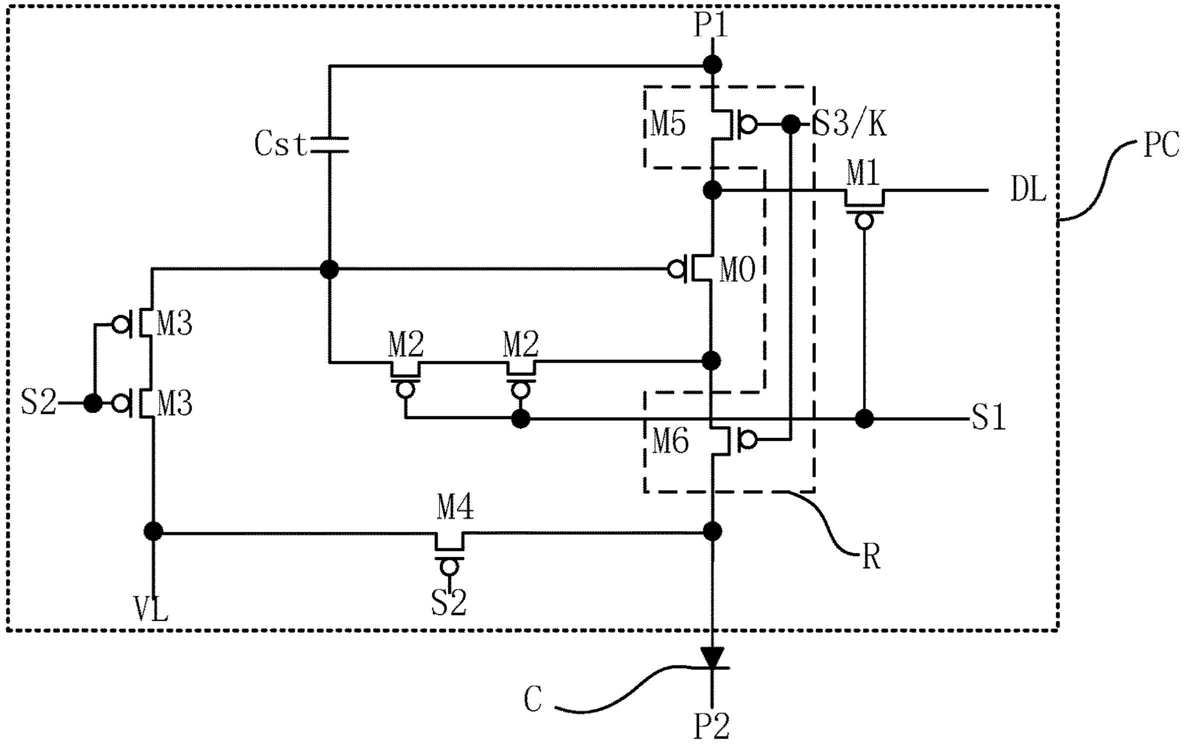
FIG. 1 is a schematic diagram of a pixel circuit in the related art.

FIG. 1 is a schematic diagram of a pixel circuit in the related art.

In the related art, as shown in FIG. 1, a light-emitting element C in a display panel is driven by a pixel circuit PC, and the pixel circuit PC has a leakage current about $10^{-12}$ A. The leakage current may cause the following problem. A potential of a gate of a driving transistor M0 changes in a light-emitting phase T30 due to the presence of leakage current, and accordingly, the light-emitting signal changes, causing a flicker problem of the light-emitting element C. Especially, the light-emitting phase of the light-emitting element C in the low-frequency display is longer, so the leakage current is more serious. Brightness change in a frame is the most significant reason for flickering. The flicker problem of the display panel in low-frequency display mode is easily observable, which seriously affects the display effect.

Through research, the inventors provide a solution to the above problem.

Figure 2:
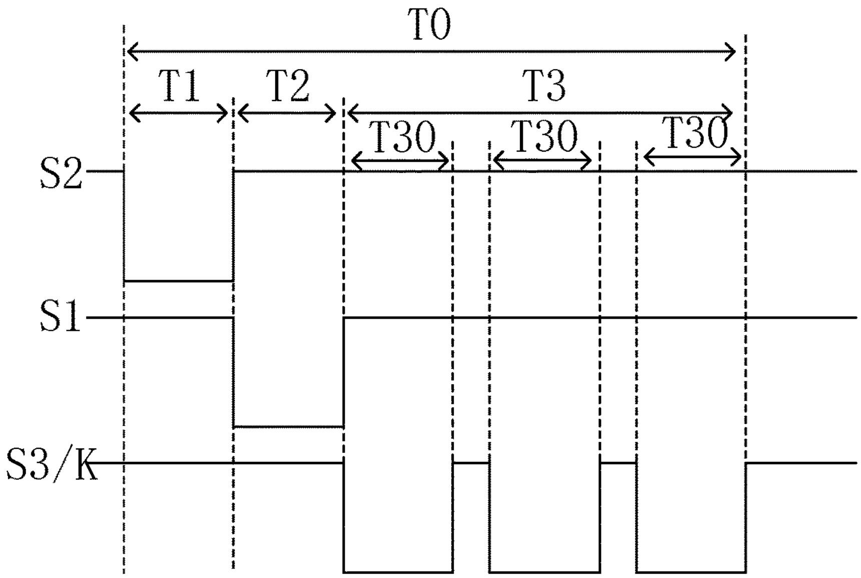
FIG. 2 is an operation timing sequence of the pixel circuit shown in FIG. 1.

FIG. 2 is an operation timing sequence of the pixel circuit shown in FIG. 1.

A display panel provided by embodiments of the present disclosure includes a pixel circuit PC and a light-emitting element C. The pixel circuit PC is electrically connected to the light-emitting element C. The pixel circuit PC may include multiple transistors. The transistors may be Low Temperature Polycrystalline Silicon Thin Film transistors (LTPS-TFT). The light-emitting element C includes an organic light-emitting diode (OLED), a micro light-emitting diode (Micro-LED), a mini light-emitting diode (Mini-LED), and the like.

The pixel circuit PC is configured to supply a light-emitting signal to the light-emitting element C. For example, the pixel circuit PC is configured to supply a light-emitting driving current to the light-emitting element C. As shown in FIG. 1 and FIG. 2, the pixel circuit PC operates in the following manner.

The pixel circuit PC includes a driving transistor M0, a data writing transistor M1, a threshold acquiring transistor M2, a first reset transistor M3, a second reset transistor M4, a power supply voltage input transistor M5, a light-emitting control transistor M6 and a capacitor Cst. The data writing transistor M1 has an input terminal electrically connected to a data line DL, an output terminal electrically connected to an input terminal of the driving transistor M0, and a gate electrically connected to a first scan line S1. The threshold acquiring transistor M2 has an input terminal electrically connected to an output terminal of the driving transistor M0, an output terminal electrically connected to a gate of the driving transistor M0, and a gate electrically connected to the first scan line S1. The first reset transistor M3 has an input terminal electrically connected to a reset signal line VL, an output terminal electrically connected to the gate of the driving transistor M0, and a gate electrically connected to a second scan line S2. The second reset transistor M4 has an input terminal electrically connected to the reset signal line VL, an output terminal electrically connected to an output terminal of the light-emitting control transistor M6, and a gate electrically connected to the second scan line S2. The power supply voltage input transistor M5 has an input terminal electrically connected to a first power supply voltage line P1, an output terminal electrically connected to the input terminal of the driving transistor M0, and a gate electrically connected to a third scan line S3. The light-emitting control transistor M6 has an input terminal electrically connected to the output terminal of the driving transistor M0, an output terminal electrically connected to the light-emitting element C, and a gate electrically connected to the third scan line S3. The capacitor Cst has a first plate electrically connected to the gate of the driving transistor M0 and a second plate electrically connected to a fixed potential signal terminal, such as the first power supply voltage line P1. The light-emitting element C is further electrically connected to a second power supply voltage line P2.

As shown in FIG. 1 and FIG. 2, an operation cycle TO of the pixel circuit PC includes a reset phase T1, a data writing phase T2, and a light-emitting phase T3. In the reset phase T1, the second scan line S2 supplies an enable signal, and the first reset transistor M3 and the second reset transistor M4 are turned on by the enable signal. A reset voltage provided by the reset signal line VL is transmitted to the gate of the driving transistor M0 and the output terminal of the light-emitting control transistor M6 through the turned-on first reset transistor M3 and the turned-on second reset transistor M4 respectively. In the data writing phase T2, the first scan line S1 supplies an enable signal, and the data writing transistor M1 and the threshold acquiring transistor M2 are turned on by the enable signal. A data voltage provided by the data line DL is transmitted the gate of the driving transistor M0 through the turned-on data writing transistor M1 and the turned-on threshold acquiring transistor M2. In the light-emitting phase T3, the third scan line S3 supplies an enable signal, and the power supply voltage input transistor M5 and the light-emitting control transistor M6 are turned on by the enable signal. The power supply voltage provided by the first power supply voltage line P1 is transmitted to the input terminal of the driving transistor M0 through the turned-on power supply voltage input transistor M5. The light-emitting driving current generated by the driving transistor M0 is transmitted to the light-emitting element C through the turned-on light-emitting control transistor M6.

The light-emitting driving current generated by the driving transistor M0 may be regarded as the light-emitting signal supplied by the pixel circuit PC to the light-emitting element C. The magnitude of the light-emitting signal depends on the potential of the gate of the driving transistor M0. In related art, the potential of the gate of the driving transistor M0 is constantly changing in the light-emitting phase due to the leakage current, leading to the changing of the light-emitting signal and the flicker of the light-emitting element C. The flicker problem of the light-emitting element C is mainly because the light-emitting signal received by the light-emitting element C in the start stage of the light-emitting phase is significantly different from the light-emitting signal received by the light-emitting element C in the end stage of the light-emitting phase. The brightness change of the light-emitting element C will be recognized by human eyes. To solve this problem, the light-emitting phase T3 is divided into multiple light-emitting sub-phases T30.

It should be noted that the pixel circuit PC in the present disclosure may be a pixel circuit PC of a structure other than the pixel circuit PC shown in FIG. 1. For example, the pixel circuit PC does not include the threshold acquiring transistor M2, and/or, the gates of the first reset transistor M3 and the second reset transistor M4 are connected to different scan lines, and/or, the gates of the data writing transistor M1 and the threshold acquiring transistor M2 are connected to different scan lines. The structure of the pixel circuit PC is not limited in the present disclosure.

It should be noted that the operation process of the pixel circuit PC in the present disclosure may be an operation process other than the operation process shown in FIG. 2. For example, the operation cycle of the pixel circuit PC may further include a phase for biasing the driving transistor M0, and/or, the first reset transistor M3 and the second reset transistor M4 are not turned on at the same time, and/or, the data writing transistor M1 and the threshold acquiring transistor M2 are not turned on at the same time, and/or the light-emitting phase T3 may be divided into another number of light-emitting sub-phases T30 other than 3 light-emitting sub-phases T30 shown in FIG. 2. The operation process of the pixel circuit PC is not limited in the present disclosure.

Figure 3:
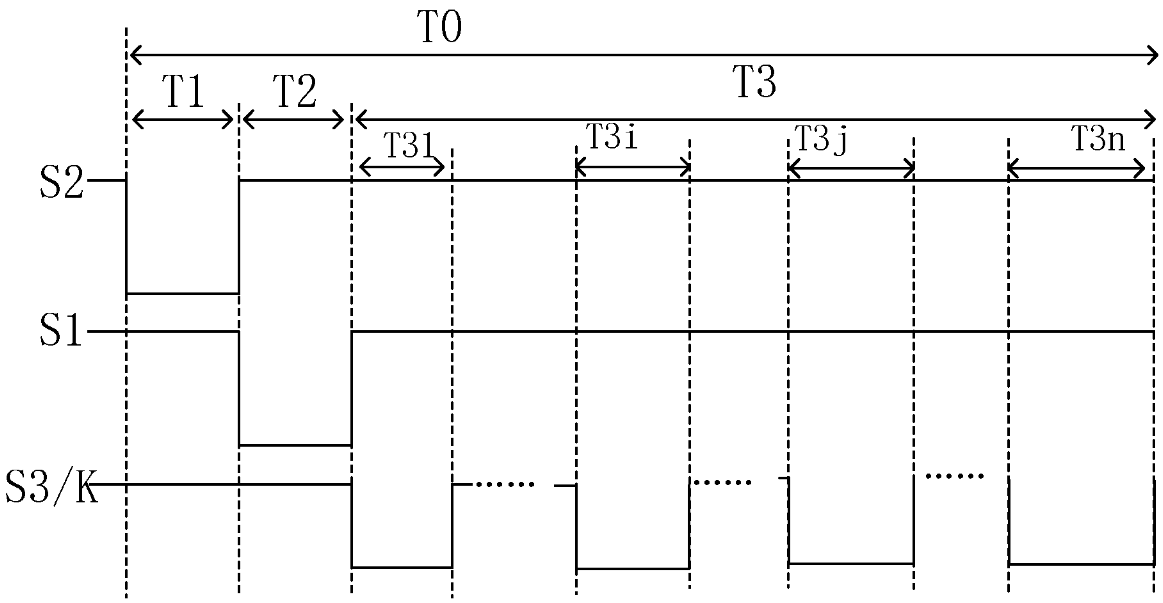
FIG. 3 is an operation timing sequence of a display panel according to some embodiments of the present disclosure.

FIG. 3 is an operation timing sequence of a display panel according to some embodiments of the present disclosure.

In some embodiments of the present disclosure, as shown in FIG. 3, at least one light-emitting phase T3 of the light-emitting element C includes n light-emitting sub-phases T30. For example, the n light-emitting sub-phases T30 include a first light-emitting sub-phase T31, . . . , an $i^{th}$ light-emitting sub-phase T3*i*, . . . , a $j^{th}$ light-emitting sub-phase T3*i*, . . . , an $n^{th}$ light-emitting sub-phase T3*n*. As shown in FIG. 1 to FIG. 3, the n light-emitting sub-phases T30 correspond to n turned-on phases of the power supply voltage input transistor M5 and the light-emitting control transistor M6. That means that in each light-emitting sub-phase T30, the power supply voltage input transistor M5 and the light-emitting control transistor M6 are turned on. The pixel circuit PC supplies the light-emitting signal to the light-emitting element C in the light-emitting sub-phases T30. In one operation cycle of the pixel circuit PC, the pixel circuit PC supplies, for n times, the light-emitting signal to the light-emitting element C.

A duration ti of transmitting the light-emitting signal to the light-emitting element by the pixel circuit in the $i^{th}$ light-emitting sub-phase of the n light-emitting sub-phases is smaller than a duration tj of transmitting the light-emitting signal to the light-emitting element by the pixel circuit in the $j^{th}$ light-emitting sub-phase of the n light-emitting sub-phases, where $0<ti$, $0<tj$, $1\leq i\leq n$, $1\leq j\leq n$, and $i\neq j$. That means that in one light-emitting phase T3, at least two light-emitting sub-phases T30 have different light-emitting durations.

Through analyzing the pixel circuit and its operation process, the inventors found that the brightness of the light-emitting element is still different in the multiple light-emitting sub-phases T30. In some cases, the brightness difference may be recognized by human eyes easily, causing poor user experience. In embodiments of the present disclosure, at least part of the light-emitting sub-phases T30 in one light-emitting phase T3 are configured to have different light-emitting durations. By adjusting the different light-emitting durations, the brightness difference of the light-emitting element C in different light-emitting sub-phases T30 caused by the leakage current of the pixel circuit PC will be compensated, overcoming the flicker problem.

Figure 4:
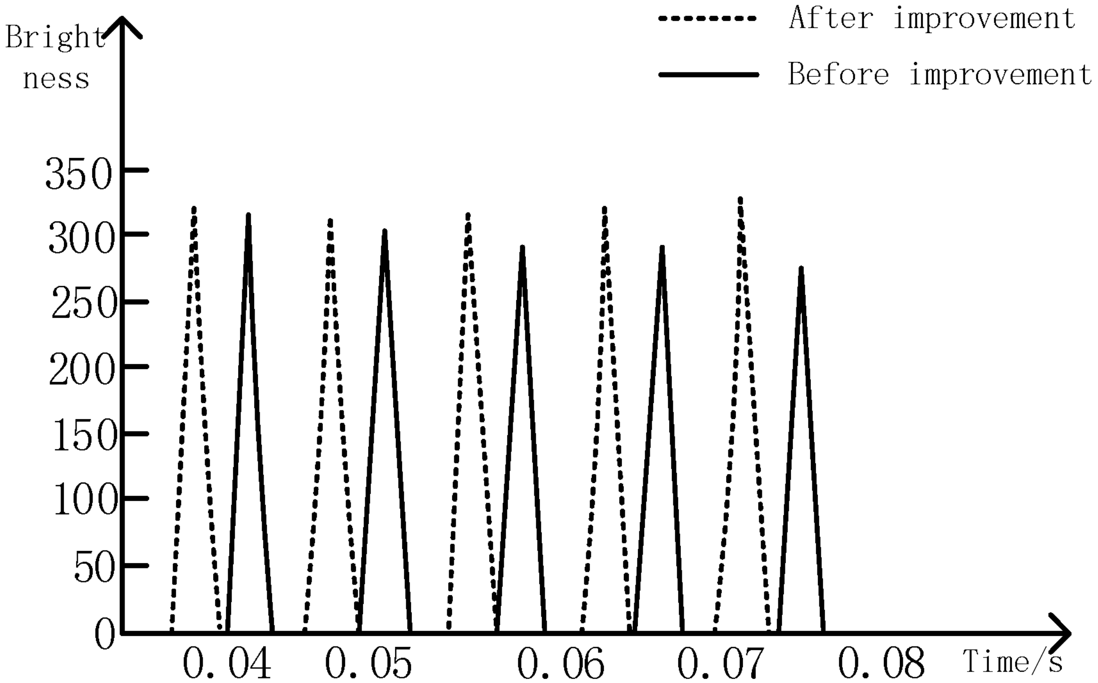
FIG. 4 is a comparison graph of a flicker value of a display panel before improvement and a flicker value of a display panel after improvement according to some embodiments of the present disclosure.

FIG. 4 is a comparison graph of a flicker value of a display panel before improvement and a flicker value of a display panel after improvement according to some embodiments of the present disclosure.

In an embodiment, a formula for calculating the flicker is as follows.

$$\text{Flicker value}=20\ \lg[(L\text{max}-L\text{min})/L\text{max}]=20\ \lg(\Delta L/L\text{max}).$$

Flicker value has a negative value, Lmax denotes the maximum brightness, and Lmin denotes the minimum brightness.

With reference to the above formula for calculating the flicker value, in the multiple light-emitting sub-phases T30, when the brightness difference between the light-emitting sub-phase 30 having the maximum brightness and the light-emitting sub-phase 30 having the minimum brightness is small, the flicker value is reduced, the flicker problem is alleviated, and the display effect of the display panel is improved. Since the flicker value is a negative value, the smaller the flicker value is, the slighter the flicker problem is, and the better the display effect will be. As shown in FIG. 4, the brightness difference in the light-emitting sub-phases T30 of the improved display panel provided by embodiments of the present disclosure is reduced compared with the display panel before improvement. That means that the flicker value of the display panel provided by embodiments of the present disclosure in one light-emitting phase T3 is smaller than the flicker value of the display panel before improvement in one light-emitting phase T3. Accordingly, the flicker degree is reduced, and the display effect is improved.

In some embodiments of the present disclosure, as shown in FIG. 1, the pixel circuit PC further includes a light-emitting control circuit R. When being turned on, the light-emitting control circuit R controls the pixel circuit PC to supply the light-emitting signal to the light-emitting element C. When the light-emitting control circuit R is turned on, the operation phase of the pixel circuit C is the light-emitting sub-phase T30.

The light-emitting control circuit R is electrically connected to a first control line K. The first control line K is configured to turn on the light-emitting control circuit R when receiving the enable signal. The duration of transmitting the enable signal by the first control line K in the $i^{th}$ light-emitting sub-phase T30 is smaller than the duration of transmitting the enable signal by the first control line K in the $j^{th}$ light-emitting sub-phase T30. The duration of transmitting the light-emitting signal by the pixel circuit PC to the light-emitting element C in the light-emitting sub-phase is controlled through the duration of transmitting the enable signal by the first control line K, so that the duration ti is smaller than the duration tj, thereby alleviating the flicker problem of the display panel.

The light-emitting control circuit R may include the power supply voltage input transistor M5 and the light-emitting control transistor M6 in the above embodiments. The first control line K electrically connected to the light-emitting control circuit R may be the third scan line S3.

In some embodiments of the present disclosure, in the n light-emitting sub-phases T30 in the same light-emitting phase T3, the brightness of the light-emitting element C in the first light-emitting sub-phase T31 and the brightness of the light-emitting element C in the $n^{th}$ light-emitting sub-phase T3*n* correspond to a flicker value that is smaller than or equal to −40 dB. The reason why the flicker is recognized is the significant brightness difference between the first light-emitting sub-phase and the last light-emitting sub-phase in the light-emitting phase T3. In the embodiments of the present disclosure, the flicker value corresponding to the brightness in the first light-emitting sub-phase T31 and the brightness in the $n^{th}$ light-emitting sub-phase T3*n* is set to be smaller than or equal to −40 dB. As a result, the flicker is difficult to recognize, power consumption is reduced in the low-frequency display mode, and the display effect is improved.

In embodiments of the present disclosure, the brightness in the first light-emitting sub-phase T31 and the brightness in the $n^{th}$ light-emitting sub-phase T3*n* are adjusted by controlling the durations of supplying the light-emitting signal by the pixel circuit PC to the light-emitting element C, so that the flicker value corresponding to the brightness in the first light-emitting sub-phase T31 and the brightness in the $n^{th}$ light-emitting sub-phase T3*n* is set to be smaller than or equal to −40 dB.

In some embodiments of the present disclosure, in the n light-emitting sub-phases, the flicker value corresponding to the brightness of the light-emitting element C in the first light-emitting sub-phase T31 and the brightness of the light-emitting element C in the $i^{th}$ light-emitting sub-phase T3*i* is smaller than or equal to −40 dB, and the flicker value corresponding to the brightness of the light-emitting element C in the $i^{th}$ light-emitting sub-phase T3*i* and the brightness of the light-emitting element C in the $n^{th}$ light-emitting sub-phase T3*n* is smaller than or equal to −40 dB, where $1<i\leq n$.

In some embodiments of the present disclosure, in the n light-emitting sub-phases T30 of the same light-emitting phase T3, the flicker value corresponding to the brightness of the light-emitting element C in the first light-emitting sub-phase T31 and the brightness of the light-emitting element C in any other light-emitting sub-phase T30 is smaller than or equal to −40 dB. The difference between the brightness of the light-emitting element C in the first light-emitting sub-phase T31 and the brightness of the light-emitting element C in any other light-emitting sub-phase T30 is reduced, so the flicker problem is further reduced, thereby further improving the display effect.

Further, in the n light-emitting sub-phases T30 of the same light-emitting phase T3, the flicker value corresponding to the brightness of the light-emitting element C in the first light-emitting sub-phase T31 and the brightness of the light-emitting element C in any other light-emitting sub-phase T30 is smaller than or equal to −40 dB. In the n light-emitting sub-phases T30 excluding the first light-emitting sub-phase T31, the flicker value corresponding to the brightness of the light-emitting element C in at least two light-emitting sub-phases T30 is smaller than or equal to −40 dB.

In some embodiments of the present disclosure, in the n light-emitting sub-phases T30 of the same light-emitting phase T3, the flicker value corresponding to the brightness of the light-emitting element C in any two light-emitting sub-phases T30 is smaller than or equal to −40 dB. Reducing the brightness difference of any two light-emitting sub-phases T30 can greatly alleviate the flicker problem.

Further, the flicker value corresponding to the brightness of the light-emitting element C in any two adjacent light-emitting sub-phases T30 is smaller than or equal to −40 dB.

In embodiments of the present disclosure, the flicker value is adjusted to a preset range by adjusting the light-emitting durations of the n light-emitting sub-phases. Moreover, the duration of supplying the light-emitting signal by the pixel circuit PC to the light-emitting element C in the light-emitting sub-phase is controlled through the duration of supplying the enable signal by the first control line K, such that the flicker value is adjusted to the preset range.

In some embodiments of the present disclosure, in the n light-emitting sub-phases T30 of the same light-emitting phase T3, the light-emitting element C has the same brightness in any two adjacent light-emitting sub-phases T30.

In some embodiments of the present disclosure, as shown in FIG. 3, in the n light-emitting sub-phases T30 of the same light-emitting phase T3, the duration of supplying the light-emitting signal by the pixel circuit PC to the light-emitting element C in the first light-emitting sub-phase T31 is t1, the duration of supplying the light-emitting signal by the pixel circuit PC to the light-emitting element C in the $n^{th}$ light-emitting sub-phase T3*n* is tn, and $\Delta t=|t1-tn|$. Δt is greater than or equal to the difference between the durations of supplying the light-emitting signal by the pixel circuit PC to the light-emitting element C in any two of the n light-emitting sub-phases T30. That means the absolute value of the difference between the duration of supplying the light-emitting signal by the pixel circuit PC to the light-emitting element C in the first light-emitting sub-phase T31 and the duration of supplying the light-emitting signal by the pixel circuit PC to the light-emitting element C in the $n^{th}$ light-emitting sub-phase T3*n* is the maximum one of the absolute value of the difference between the duration of supplying the light-emitting signal by the pixel circuit PC to the light-emitting element C in any two light-emitting sub-phases T30.

The reason why the flicker in the light-emitting phase T3 is observed is that the brightness of the first light-emitting sub-phase T31 is significantly different from the brightness of the $n^{th}$ light-emitting sub-phase T3n. Since the brightness difference between the first light-emitting sub-phase T31 and the $n^{th}$ light-emitting sub-phase T3n is maximum, the flicker may be alleviated by compensating the brightness of the $n^{th}$ light-emitting sub-phase T3n by the maximum degree or compensating the brightness of the first light-emitting sub-phase T31 by the maximum degree.

In some embodiments of the present disclosure, the absolute value of the difference between the duration of transmitting the enable signal by the first control line K in the first light-emitting sub-phase T31 and the duration of transmitting the enable signal by the first control line K in the $n^{th}$ light-emitting sub-phase T3n is greater than or equal to the absolute value of the difference between the durations of transmitting the enable signal by the first control line K in any two light-emitting sub-phase T30.

In some embodiments of the present disclosure, as shown in FIG. 3, in the n light-emitting sub-phases T30 in the same light-emitting phase T3, the duration of transmitting the light-emitting signal to the light-emitting element C by the pixel circuit PC in the first light-emitting sub-phase T31 is smaller than the duration of transmitting the light-emitting signal to the light-emitting element C by the pixel circuit PC in any light-emitting sub-phase T30 other than the first light-emitting sub-phase T31. In the related art, the leakage current of the gate of the driving transistor M0 is gradually increased over time in one light-emitting phase T3. Therefore, in one light-emitting phase T3, the leakage current in the first light-emitting sub-phase T31 is the minimum one. The duration of transmitting the light-emitting signal to the light-emitting element C by the pixel circuit PC in the first light-emitting sub-phase T31 is set to be shortest, such that the reduced brightness in any other light-emitting sub-phase T30 due to the leakage current of the pixel circuit PC is compensated. In this way, the brightness difference between the first light-emitting sub-phase T31 and any other light-emitting sub-phase T30 is reduced, the flicker problem is solved, and the display effect of the display panel is improved.

In some embodiments of the present disclosure, the duration of transmitting the enable signal by the first control line K in the first light-emitting sub-phase T31 is smaller than or equal to the duration of transmitting the enable signal by the first control line K in any light-emitting sub-phase T30 other than the first light-emitting sub-phase T31. In some embodiments of the present disclosure, in the n light-emitting sub-phases T30 in the same light-emitting phase T3, the duration of transmitting the light-emitting signal to the light-emitting element C by the pixel circuit PC in the first light-emitting sub-phase T31 is smaller than the duration of transmitting the light-emitting signal to the light-emitting element C by the pixel circuit PC in any light-emitting sub-phase T30 other than the first light-emitting sub-phase T31.

Figure 5:
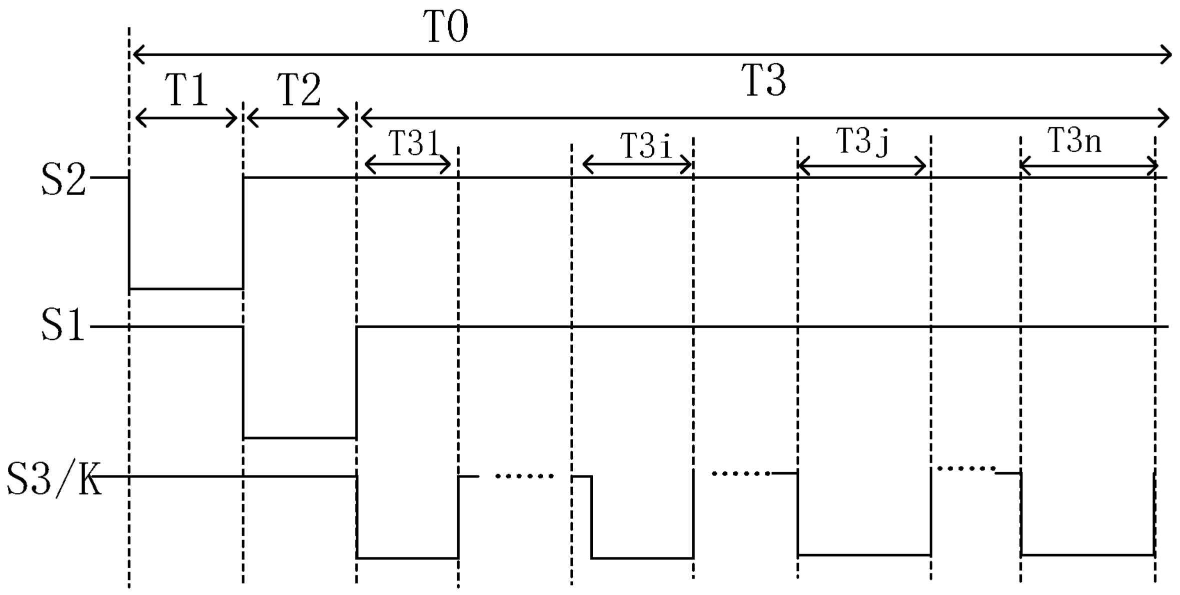
FIG. 5 is a driving timing sequence of a display panel according to some embodiments of the present disclosure.

FIG. 5 is a driving timing sequence of a display panel according to some embodiments of the present disclosure.

In some embodiments of the present disclosure, as shown in FIG. 5, in the n light-emitting sub-phases T30 in the same light-emitting phase T3, the duration of transmitting the light-emitting signal to the light-emitting element C by the pixel circuit PC in the first light-emitting sub-phase T31 is smaller than the duration of transmitting the light-emitting signal to the light-emitting element C by the pixel circuit PC in at least one of the light-emitting sub-phases T30 other than the first light-emitting sub-phase T31, and the duration of transmitting the light-emitting signal to the light-emitting element C by the pixel circuit PC in the first light-emitting sub-phase T31 is equal to the duration of transmitting the light-emitting signal to the light-emitting element C by the pixel circuit PC in another at least one of the light-emitting sub-phases T3 other than the first light-emitting sub-phase T31. For example, as shown in FIG. 4, the duration of transmitting the light-emitting signal to the light-emitting element C by the pixel circuit PC is the same in the first light-emitting sub-phase T31 to the $i^{th}$ light-emitting sub-phase T3i, the duration of transmitting the light-emitting signal to the light-emitting element C by the pixel circuit PC is the same in the $j^{th}$ light-emitting sub-phase T3j to the $n^{th}$ light-emitting sub-phase T3n, and the duration of transmitting the light-emitting signal to the light-emitting element C by the pixel circuit PC in the first light-emitting sub-phase T31 is smaller than the duration of transmitting the light-emitting signal to the light-emitting element C by the pixel circuit PC in the $n^{th}$ light-emitting sub-phase T3n, where $1>i>j>n$.

In some embodiments of the present disclosure, as shown in FIG. 3 and FIG. 5, in the n light-emitting sub-phases T30 in the same light-emitting phase T3, the duration of transmitting the light-emitting signal to the light-emitting element C by the pixel circuit PC in the $n^{th}$ light-emitting sub-phase T3n is greater than or equal to the duration of transmitting the light-emitting signal to the light-emitting element C by the pixel circuit PC in any light-emitting sub-phase T30 other than the $n^{th}$ light-emitting sub-phase T3n. Conventionally, the leakage current of the gate of the driving transistor M0 is gradually increased over time in one light-emitting phase T3. Therefore, in one light-emitting phase T3, the leakage current in the $n^{th}$ light-emitting sub-phase T3n is the maximum one. The duration of transmitting the light-emitting signal to the light-emitting element C by the pixel circuit PC in the $n^{th}$ light-emitting sub-phase T3n is set to be longest, such that the brightness in the $n^{th}$ light-emitting sub-phase T3n is compensated by a maximum amount. In this way, the brightness difference between the $n^{th}$ light-emitting sub-phase T3n and any other light-emitting sub-phase T30 is reduced, the flicker problem is solved, and the display effect of the display panel is improved.

In some embodiments of the present disclosure, the duration of transmitting the enable signal by the first control line K in the $n^{th}$ light-emitting sub-phase T3n is greater than the duration of transmitting the enable signal by the first control line K in any light-emitting sub-phase T3n other than the $n^{th}$ light-emitting sub-phase T3n.

In some embodiments of the present disclosure, as shown in FIG. 3, in the n light-emitting sub-phases T30 in the same light-emitting phase T3, the duration of transmitting the light-emitting signal to the light-emitting element C by the pixel circuit PC in the $n^{th}$ light-emitting sub-phase T3n is greater than the duration of transmitting the light-emitting signal to the light-emitting element C by the pixel circuit PC in any light-emitting sub-phase T30 other than the $n^{th}$ light-emitting sub-phase T3n. For example, as shown in FIG. 3, the duration of transmitting the light-emitting signal to the light-emitting element C by the pixel circuit PC in the $n^{th}$ light-emitting sub-phase T3n is greater than the duration of transmitting the light-emitting signal to the light-emitting element C by the pixel circuit PC in any one of the first light-emitting sub-phase T31 to the $j^{th}$ light-emitting sub-phase T3j, where $1>j>n$.

In some embodiments of the present disclosure, as shown in FIG. 5, in the n light-emitting sub-phases T30 in the same light-emitting phase T3, the duration of transmitting the light-emitting signal to the light-emitting element C by the pixel circuit PC in the $n^{th}$ light-emitting sub-phase T3*n* is greater than the duration of transmitting the light-emitting signal to the light-emitting element C by the pixel circuit PC in at least one of the light-emitting sub-phases T3 other than the $n^{th}$ light-emitting sub-phase T3*n*, and the duration of transmitting the light-emitting signal to the light-emitting element C by the pixel circuit PC in the $n^{th}$ light-emitting sub-phase T3*n* is equal to the duration of transmitting the light-emitting signal to the light-emitting element C by the pixel circuit PC in another at least one of the light-emitting sub-phases T30 other than the $n^{th}$ light-emitting sub-phase T3*n*. For example, as shown in FIG. 5, the duration of transmitting the light-emitting signal to the light-emitting element C by the pixel circuit PC is the same in the first light-emitting sub-phase T31 to the $i^{th}$ light-emitting sub-phase T3*i*, the duration of transmitting the light-emitting signal to the light-emitting element C by the pixel circuit PC is the same in the $j^{th}$ light-emitting sub-phase T3*j* to the $n^{th}$ light-emitting sub-phase T3*n*, and the duration of transmitting the light-emitting signal to the light-emitting element C by the pixel circuit PC in the $n^{th}$ light-emitting sub-phase T3*n* is greater than the duration of transmitting the light-emitting signal to the light-emitting element C by the pixel circuit PC in the first light-emitting sub-phase T31, where 1>i>j>n.

In some embodiments of the present disclosure, as shown in FIG. 3 and FIG. 5, in the n light-emitting sub-phases T30 in the same light-emitting phase T3, the duration of transmitting the light-emitting signal to the light-emitting element C by the pixel circuit PC in the first light-emitting sub-phase T31 is smaller than the duration of transmitting the light-emitting signal to the light-emitting element C by the pixel circuit PC in any light-emitting sub-phase T30 other than the first light-emitting sub-phase T31, and the duration of transmitting the light-emitting signal to the light-emitting element C by the pixel circuit PC in the $n^{th}$ light-emitting sub-phase T3*n* is greater than the duration of transmitting the light-emitting signal to the light-emitting element C by the pixel circuit PC in any light-emitting sub-phase T30 other than the $n^{th}$ light-emitting sub-phase T3*n*. For example, in the first light-emitting sub-phase T31 to the $i^{th}$ light-emitting sub-phase T3*i*, the duration of transmitting the light-emitting signal to the light-emitting element C by the pixel circuit PC in the first light-emitting sub-phase T31 is equal to the duration of transmitting the light-emitting signal to the light-emitting element C by the pixel circuit PC in any of the second light-emitting sub-phase T32 to the $i^{th}$ light-emitting sub-phase T3*i*. In the $(i+1)^{th}$ light-emitting sub-phase T3(*i*+1) to the $n^{th}$ light-emitting sub-phase T3*n*, the duration of transmitting the light-emitting signal to the light-emitting element C by the pixel circuit PC in the $(i+1)^{th}$ light-emitting sub-phase T3(*i*+1) is smaller than the duration of transmitting the light-emitting signal to the light-emitting element C by the pixel circuit PC in any one of the $(i+2)^{th}$ light-emitting sub-phase T3(*i*+2) to the $n^{th}$ light-emitting sub-phase T3*n*, where 1<i≤N. That is, in the n light-emitting sub-phases T30 in the same light-emitting phase T3, the duration of transmitting the light-emitting signal to the light-emitting element C by the pixel circuit PC in the light-emitting sub-phases T30 with smaller serial numbers is shorter, and the duration of transmitting the light-emitting signal to the light-emitting element C by the pixel circuit PC in the light-emitting sub-phases T30 with larger serial numbers is longer. In this way, the reduced brightness of the light-emitting sub-phases T30 with larger serial numbers due to the leakage current of the pixel circuit PC is compensated, and the brightness difference between the light-emitting sub-phases T30 with larger serial numbers and the light-emitting sub-phases T30 with smaller serial numbers is reduced, which further alleviates the flicker problem.

In some embodiments of the present disclosure, as shown in FIG. 3, any two light-emitting sub-phases in the n light-emitting sub-phases T30 in the same light-emitting phase T3 are different in duration of transmitting the light-emitting signal to the light-emitting element C by the pixel circuit PC. Further, for the light-emitting sub-phase T30 in which the pixel circuit PC has a larger leakage current, its duration of transmitting the light-emitting signal to the light-emitting element C by the pixel circuit PC is longer. For the light-emitting sub-phase T30 in which the pixel circuit PC has a smaller leakage current, its duration of transmitting the light-emitting signal to the light-emitting element C by the pixel circuit PC is shorter. In this way, the brightness of the light-emitting sub-phase T30 in which the pixel circuit PC has a smaller leakage current is compensated more accurately.

In some embodiments of the present disclosure, any two light-emitting sub-phases T30 of the n light-emitting sub-phases T30 are different in duration of transmitting the enable signal by the first control line K. In some embodiments of the present disclosure, the durations of transmitting the light-emitting signal to the light-emitting element C by the pixel circuit PC in any two adjacent light-emitting sub-phases T30 of the n light-emitting sub-phases T30 of the same light-emitting phase T3 are arranged in equal difference. Further, the difference between the durations of transmitting the light-emitting signal to the light-emitting element C by the pixel circuit PC in any two adjacent light-emitting sub-phases T30 of the n light-emitting sub-phases T30 of the same light-emitting phase T3 is Δt', which is a preset value. That is, in the n light-emitting sub-phases T30 of the same light-emitting phase T3, the duration of transmitting the light-emitting signal to the light-emitting element C by the pixel circuit PC in the $(i+1)^{th}$ light-emitting sub-phase T3(*i*+1) is longer than the duration of transmitting the light-emitting signal to the light-emitting element C by the pixel circuit PC in the $i^{th}$ light-emitting sub-phase T3*i* by Δt'. The magnitude of the leakage current of the pixel circuit PC is linearly related to time. The difference between the durations of transmitting the light-emitting signal to the light-emitting element C by the pixel circuit PC in any two adjacent light-emitting sub-phases T30 is Δt', which corresponds to the relationship of the amount of the leakage current of the pixel circuit PC, thereby achieving accurate compensation to the brightness of the light-emitting sub-phases T30.

In some embodiments of the present disclosure, as shown in FIG. 5, at least two light-emitting sub-phases T30 of the n light-emitting sub-phases T30 in the same light-emitting phase T3 are equal in duration of transmitting the light-emitting signal to the light-emitting element C by the pixel circuit PC. For example, if the pixel circuit PC has a small leakage current from the $i^{th}$ light-emitting sub-phase T3*i* to the $j^{th}$ light-emitting sub-phase T3*j*, the brightness difference between the $i^{th}$ light-emitting sub-phase T3*i* and the $j^{th}$ light-emitting sub-phase T3*j* is smaller than the preset value, and the light-emitting duration of the $i^{th}$ light-emitting sub-phase T3*i* and the light-emitting direction of the $j^{th}$ light-emitting sub-phase T3*j* may be set to be equal, where 0<ti, 0<tj, 1≤i≤N, 1≤j≤N, and i≠j. In this way, the brightness of the $j^{th}$ light-emitting sub-phase T3*j* is not larger than the brightness of the $i^{th}$ light-emitting sub-phase T3*i* after the above improvement, and thus preventing the brightness in one light-emitting phase T3 varying too much, which may cause new flicker problem and reduce the display effect of the display panel.

In some embodiments of the present disclosure, at least two light-emitting sub-phases T30 are equal in the duration of transmitting the enable signal by the first control line K.

In some embodiments of the present disclosure, at least two light-emitting sub-phases T30 of the n light-emitting sub-phases T30 in the same light-emitting phase T3 are equal in the direction of transmitting the light-emitting signal to the light-emitting element C by the pixel circuit PC, and the at least two light-emitting sub-phases T30 may be adjacent light-emitting sub-phases T30 in the n light-emitting sub-phases T30. When the brightness difference between adjacent light-emitting sub-phases T30 is smaller than or equal to the preset value, the durations of transmitting the light-emitting signal to the light-emitting element C by the pixel circuit PC are equal in the adjacent light-emitting sub-phases T30. The leakage current of the pixel circuit PC changes linearly over time. Therefore, as long as the brightness difference between the $i^{th}$ light-emitting sub-phase T3*i* and the $(i+1)^{th}$ light-emitting sub-phase T3(*i*+1) is smaller than the preset value, it is determined that the brightness difference between the $i^{th}$ light-emitting sub-phase T3*i* and the $(i+2)^{th}$ light-emitting sub-phase T3(*i*+2) is smaller than the preset value.

In addition, the light-emitting durations of at least two adjacent light-emitting sub-phases T30 are equal, which can reduce the adjustment difficulty. For example, the brightness of the former one of two adjacent light-emitting sub-phases T30 is adjusted first, and then light-emitting duration of the latter one of the two adjacent light-emitting sub-phases T30 is set to be equal to the light-emitting duration of the former light-emitting sub-phase T30 whose brightness has been adjusted. Since the brightness difference between two adjacent light-emitting sub-phases T30 is small, the flicker is reduced, the display effect is improved, and the adjustment difficulty is reduced.

Figure 6:
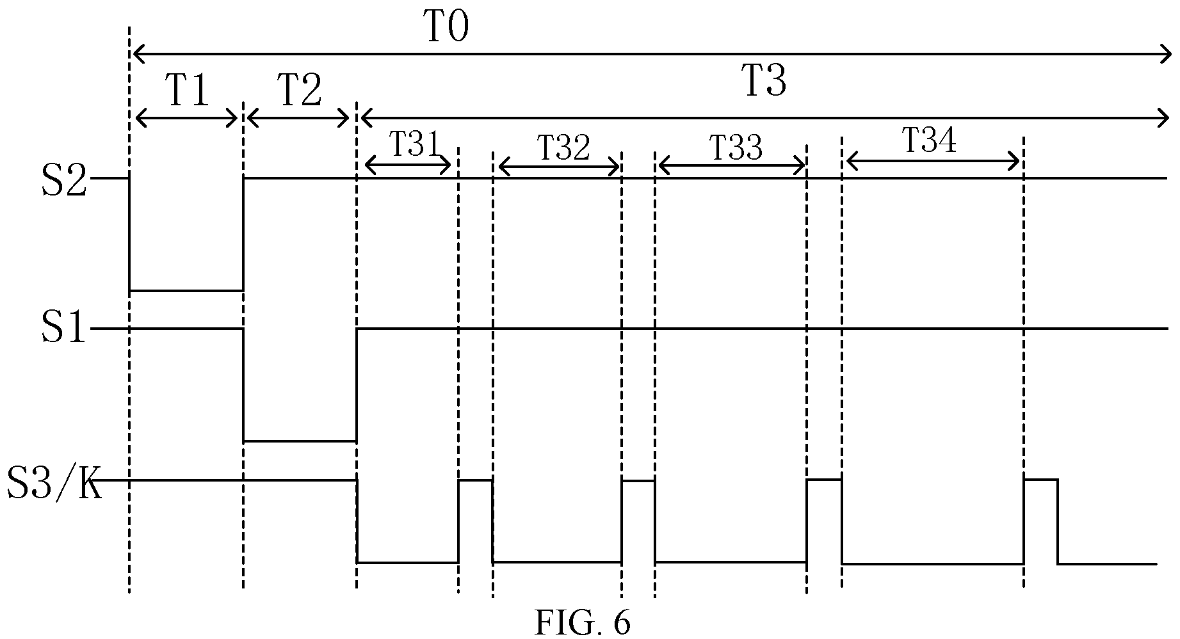
FIG. 6 is a driving timing sequence of a display panel according to some embodiments of the present disclosure.

FIG. 6 is a driving timing sequence of a display panel according to some embodiments of the present disclosure.

In some embodiments of the present disclosure, as shown in FIG. 6, at least one of the second light-emitting sub-phase T32 to the $n^{th}$ light-emitting sub-phase T3*n* of the same light-emitting phase T3 includes a duration in which the pixel circuit PC does not transmit the light-emitting signal to the light-emitting element C, and this duration may be referred to as a non-light-emitting duration. As shown in FIG. 6, the second light-emitting sub-phase T32 to the $n^{th}$ light-emitting sub-phase T3*n* are equal in the duration in which the pixel circuit PC does not transmit the light-emitting signal to the light-emitting element C. That is, the durations between any two adjacent light-emitting sub-phases T30 are equal. The duration in which the pixel circuit PC does not transmit the light-emitting signal to the light-emitting element C nearly has no affecting on the brightness. The duration in which the pixel circuit PC does not transmit the light-emitting signal to the light-emitting element C is the same, which is easy to operate. For example, the pixel circuit PC includes a light-emitting control circuit R, such arrangement can reduce the computation amount.

In some embodiments of the present disclosure, the second light-emitting sub-phase T32 to the $n^{th}$ light-emitting sub-phase T3*n* are equal in the duration the pixel circuit PC does not transmit the light-emitting signal to the light-emitting element C.

In some embodiments of the present disclosure, at least two light-emitting sub-phases T30 of the second light-emitting sub-phase T32 to the $n^{th}$ light-emitting sub-phase T3*n* in the same light-emitting phase T3 are different in the direction the pixel circuit PC does not transmit the light-emitting signal to the light-emitting element C. In the present embodiment, for at least two light-emitting sub-phases T30 of the second light-emitting sub-phase T32 to the $n^{th}$ light-emitting sub-phase T3*n*, their light-emitting durations are different, and their non-light-emitting durations are also different, and the time lengths of these light-emitting sub-phases T30 are equal.

For example, the durations in which the pixel circuit PC does not transmit the light-emitting signal to the light-emitting element C in the second light-emitting sub-phase T32 to the $i^{th}$ light-emitting sub-phase T3*i* are equal, and the durations in which the pixel circuit PC does not transmit the light-emitting signal to the light-emitting element C in the $(i+1)^{th}$ light-emitting sub-phase T3(*i*+1) to the $n^{th}$ light-emitting sub-phase T3*n* are equal, where $2<i<n$.

Moreover, when the durations of transmitting the light-emitting signal to the light-emitting element C by the pixel circuit PC in any two adjacent light-emitting sub-phases T30 are arranged in equal difference, the durations in which the pixel circuit PC does not transmit the light-emitting signal to the light-emitting element C are equal for the second light-emitting sub-phase T32 to the $i^{th}$ light-emitting sub-phase T3*i*, and the durations, in which the pixel circuit PC does not transmit the light-emitting signal to the light-emitting element C, of the $(i+1)^{th}$ light-emitting sub-phase T3(*i*+1) to the $n^{th}$ light-emitting sub-phase T3*n* decrease progressively, where $1<n$. That is, for the light-emitting sub-phases T30 with larger serial numbers, the duration of transmitting the light-emitting signal to the light-emitting element C by the pixel circuit PC is longer, and the duration in which the pixel circuit PC does not transmit the light-emitting signal to the light-emitting element C is shorter. In this way, the total time length of the light-emitting sub-phases T30 with a large serial number is not too long, and the display time of one frame of image is not increased too much, thereby ensuring the refresh ratio of the display panel.

In some embodiments of the present disclosure, any two light-emitting sub-phases T30 in the second light-emitting sub-phase T32 to the $n^{th}$ light-emitting sub-phase T3*n* of the same light-emitting phase are equal in time length. That means that for at least one of the second light-emitting sub-phase T32 to the $n^{th}$ light-emitting sub-phase T3*n*, the longer the duration of transmitting the light-emitting signal to the light-emitting element C by the pixel circuit PC is, the shorter the duration of not transmitting the light-emitting signal to the light-emitting element C by the pixel circuit PC is. In this way, the time lengths of any two light-emitting sub-phases T30 in the second light-emitting sub-phase T32 to the $n^{th}$ light-emitting sub-phase T3*n* are equal, and the display time of one frame of image is not increased, further ensuring the refresh ratio of the display panel.

Figure 7:
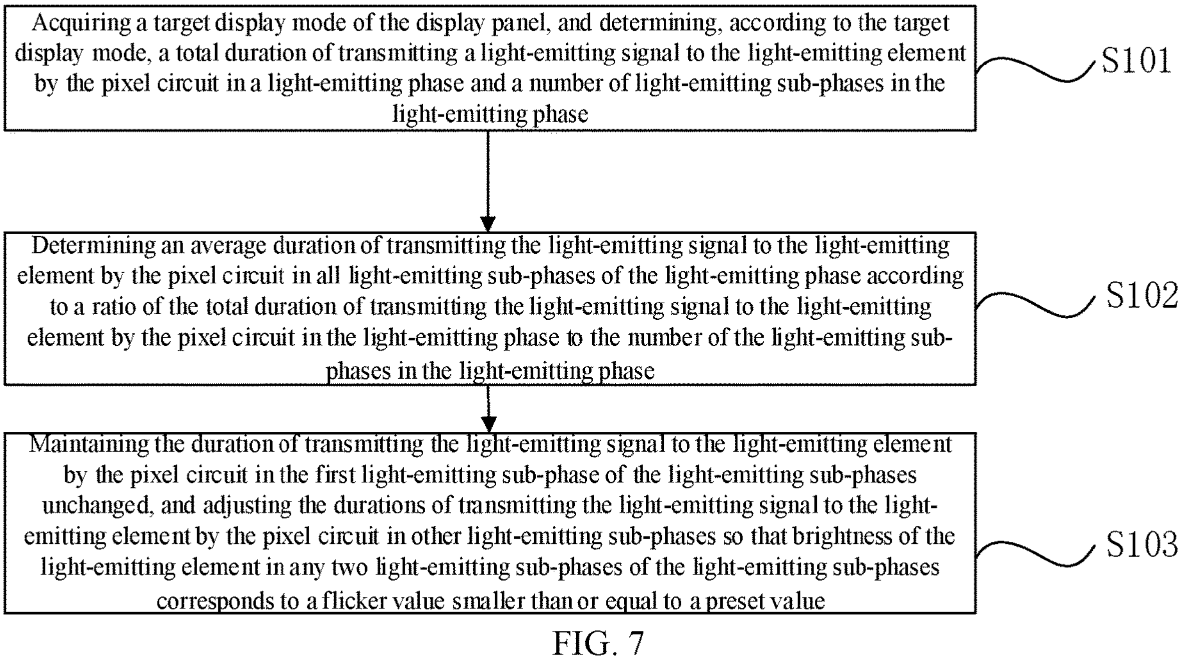
FIG. 7 is a flowchart of a method for driving a display panel according to some embodiments of the present disclosure.

FIG. 7 is a flowchart of a method for driving a display panel according to some embodiments of the present disclosure.

Embodiments of the present disclosure further provide a method for driving a display panel. The display panel includes a pixel circuit PC and a light-emitting element C that are electrically connected to each other. As shown in FIG. 7, the method includes the following steps.

In step S101, a target display mode of the display panel is acquired, and the total duration of transmitting the light-emitting signal to the light-emitting element C by the pixel circuit PC in the light-emitting phase T3 and the number of the light-emitting sub-phases T30 in the light-emitting phase T3 are determined according to the target display mode.

In some embodiments of the present disclosure, the display mode of the display panel includes a high frequency display mode, a medium-frequency display mode and a low frequency display mode. The flicker degree increases sequentially from the high-frequency display mode to the low-frequency display mode. When the total duration of transmitting the light-emitting signal to the light-emitting element C by the pixel circuit PC in the light-emitting phase T3 is the same, the number of the light-emitting sub-phases T30 in the light-emitting phase T3 decreases sequentially from the high-frequency display mode to the low-frequency display mode.

Figure 8:
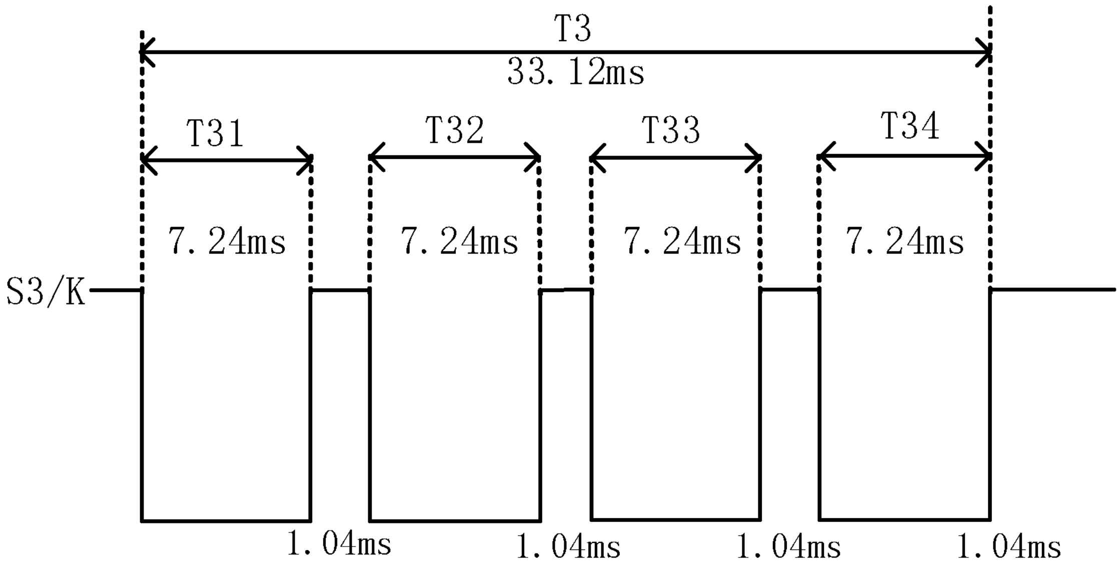
FIG. 8 is a comparison diagram of a light-emitting phase and light-emitting sub-phases according to some embodiments of the present disclosure.

FIG. 8 is a comparison diagram of a light-emitting phase and light-emitting sub-phases according to some embodiments of the present disclosure.

In the low-frequency mode, the number of the light-emitting sub-phases T30 is reduced, and the time length of the light-emitting sub-phase T30 is long. For example, in the low-frequency mode shown in FIG. 8, the total direction of transmitting the light-emitting signal to the light-emitting element C in the light-emitting phase is 4.16 ms, and the number of the light-emitting sub-phases T30 is 4.

In step S102, according to a ratio of the total duration of transmitting the light-emitting signal to the light-emitting element C by the pixel circuit PC in the light-emitting phase T3 to the number of the light-emitting sub-phases T30 in the light-emitting phase T3, an average duration of transmitting the light-emitting signal to the light-emitting element C by the pixel circuit PC in each light-emitting sub-phase T30 is determined.

As shown in FIG. 8, the total duration of transmitting the light-emitting signal to the light-emitting element C is 4.16 ms, the number of the light-emitting sub-phases T30 is 4, the ratio is 1.04 ms, and the average duration of transmitting the light-emitting signal to the light-emitting element C by the pixel circuit PC in each light-emitting sub-phase T30 is equal to the ratio 1.04 ms.

In step S103, the duration of transmitting the light-emitting signal to the light-emitting element C by the pixel circuit PC in the first light-emitting sub-phase T31 is unchanged, and the duration of transmitting the light-emitting signal to the light-emitting element C by the pixel circuit PC in any light-emitting sub-phase T30 other than the first light-emitting sub-phase T31 is adjusted so that the flicker value corresponding to the brightness of the light-emitting element C in any two light-emitting sub-phases T30 is smaller than a preset value.

Figure 9:
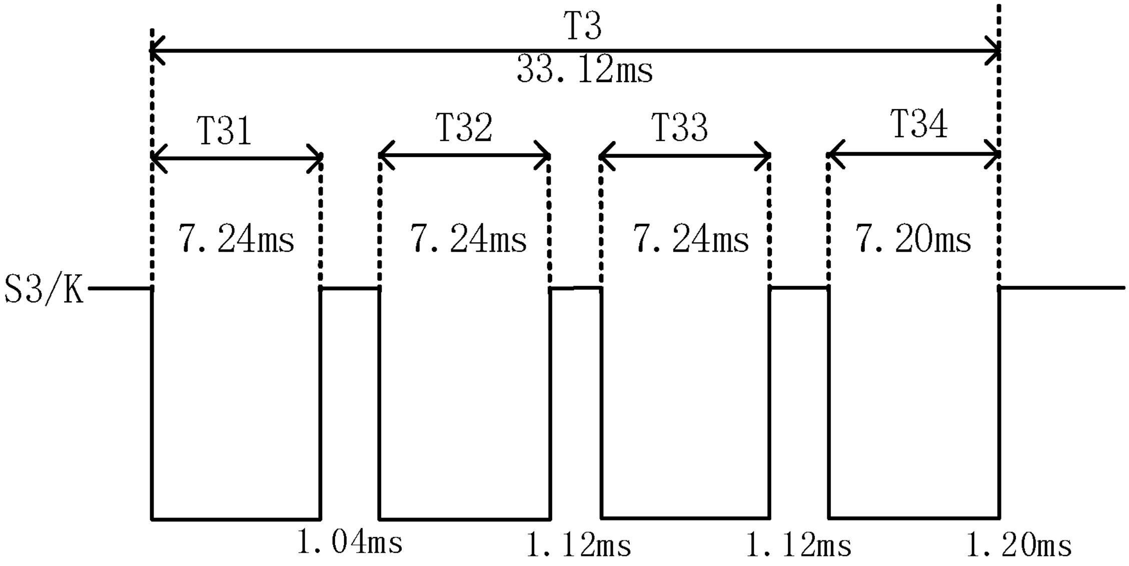
FIG. 9 is a comparison diagram of a light-emitting phase and light-emitting sub-phases after adjustment according to some embodiments of the present disclosure.

FIG. 9 is a comparison diagram of a light-emitting phase and light-emitting sub-phases after adjustment according to some embodiments of the present disclosure.

In step S103, the durations of transmitting the light-emitting signal to the light-emitting element C by the pixel circuit PC in other light-emitting sub-phases may be adjusted based on the relationship of the time lengths of the light-emitting sub-phases T30 specified by the display panel, which has been described above.

In some embodiments of the present disclosure, the duration of transmitting the light-emitting signal to the light-emitting element C by the pixel circuit PC in the first light-emitting sub-phase T31 is adjusted to be the minimum one, and the duration of transmitting the light-emitting signal to the light-emitting element C by the pixel circuit PC in the $n^{th}$ light-emitting sub-phase T3*n* is adjusted to be the maximum one. For example, as shown in FIG. 9, the duration of transmitting the light-emitting signal to the light-emitting element C by the pixel circuit PC in the first light-emitting sub-phase T31 is 1.04 ms, the duration of transmitting the light-emitting signal to the light-emitting element C by the pixel circuit PC in the second light-emitting sub-phase T32 is 1.12 ms, the duration of transmitting the light-emitting signal to the light-emitting element C by the pixel circuit PC in the third light-emitting sub-phase T33 is 1.12 ms, and the duration of transmitting the light-emitting signal to the light-emitting element C by the pixel circuit PC in the fourth light-emitting sub-phase T34 is 1.20 ms. Thus, the adjusted light-emitting duration of the first light-emitting sub-phase T31 is shortest, the light-emitting durations of the second light-emitting sub-phase T32 and the third light-emitting sub-phase T33 are equal and greater than the light-emitting duration of the first light-emitting sub-phase T31, and the light-emitting duration of the fourth light-emitting sub-phase T34 is longest. On the one hand, the reduced brightness of the second light-emitting sub-phase T32 to the fourth light-emitting sub-phase T34 due to the leakage current of the pixel circuit PC is compensated, and flicker problem is alleviated. On the other hand, the light-emitting duration of the second light-emitting sub-phase T32 is equal to the light-emitting duration of the third light-emitting sub-phase T33, so it is avoided that the brightness of the third light-emitting sub-phase T33 is greater than that of the second light-emitting sub-phase T32, which may cause a new flicker problem.

It should be noted that the duration of transmitting the light-emitting signal to the light-emitting element C by the pixel circuit PC in the first light-emitting sub-phase T31 is unchanged so as not to increase power consumption. If the brightness of the first light-emitting sub-phase T31 is increased, it needs to compensate the brightness of other light-emitting sub-phases T30 by a larger amount due to the leakage current of the pixel circuit PC, causing higher power consumption. If the durations of not transmitting the light-emitting signal to the light-emitting element C in other light-emitting sub-phases T30 are equal, increasing the durations of transmitting the light-emitting signal to the light-emitting element C by the pixel circuit PC in other light-emitting sub-phases T30 will increase the time length of the light-emitting phase T3, the display time of one frame of image will be increased too much, the refresh ratio of the display panel is reduced, and the display effect is affected.

Figure 10:
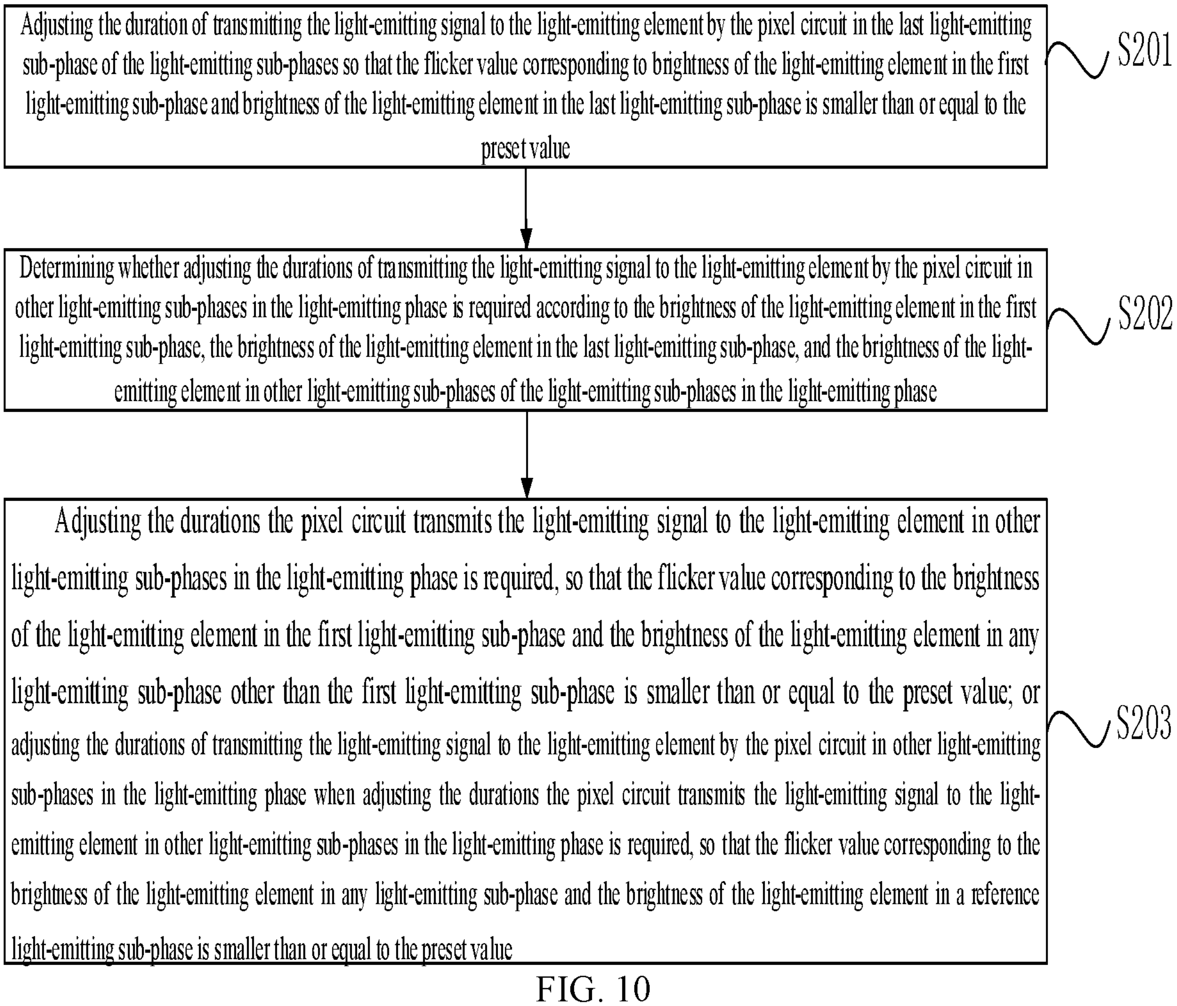
FIG. 10 is a flowchart of a method for driving a display panel according to some embodiments of the present disclosure.

FIG. 10 is a flowchart of a method for driving a display panel according to some embodiments of the present disclosure.

As shown in FIG. 10, the process of adjusting the duration of transmitting the light-emitting signal to the light-emitting element C by the pixel circuit PC in any light-emitting sub-phase T30 other than the first light-emitting sub-phase T31 so that the flicker value corresponding to the brightness of the light-emitting element C in any two light-emitting sub-phases T30 is smaller than a preset value in step S103 includes the following steps.

In step S201, the duration of transmitting the light-emitting signal to the light-emitting element C by the pixel circuit PC in the last light-emitting sub-phase T3*n* is adjusted so that the flicker value corresponding to the brightness of the light-emitting element C in the first light-emitting sub-phase T31 and the brightness of the light-emitting element C in the last light-emitting sub-phase T3*n* is smaller than or equal to the preset value.

Conventionally, the pixel circuit PC has a leakage current, and the leakage current is the largest in the $n^{th}$ light-emitting sub-phase T3*n* of one light-emitting phase T3. Accordingly, the brightness of the $n^{th}$ light-emitting sub-phase T3*n* is the smallest. In view of this, the duration of transmitting the light-emitting signal to the light-emitting element C by the pixel circuit PC in the $n^{th}$ light-emitting sub-phase T3*n* is the longest. That is, the brightness compensation amount of the $n^{th}$ light-emitting sub-phase T3*n* is the largest, the brightness difference between the $n^{th}$ light-emitting sub-phase T3*n* and any other light-emitting sub-phase T30 is reduced, the flicker is reduced, and the display effect of the display panel is improved.

In step S202, according to the brightness of the light-emitting element C in the first light-emitting sub-phase T31, the brightness of the light-emitting element C in the last light-emitting sub-phase T3*n*, and the brightness of the light-emitting element C in other light-emitting sub-phases T30 in the light-emitting phase T3, it is determined whether it needs to adjust the durations of transmitting the light-emitting signal to the light-emitting element C by the pixel circuit PC in other light-emitting sub-phases T30 in the light-emitting phase T3.

In step S202, the durations of transmitting the light-emitting signal to the light-emitting element C by the pixel circuit PC in other light-emitting sub-phases T30 may be adjusted based on the relationship of the time lengths of the light-emitting sub-phases T30 specified by the display panel, which has been described above.

In step S203, in response to a determination that it needs to adjust the durations of transmitting the light-emitting signal to the light-emitting element C by the pixel circuit PC in other light-emitting sub-phases T30 in the light-emitting phase T3, the durations of transmitting the light-emitting signal to the light-emitting element C by the pixel circuit PC in other light-emitting sub-phases T30 in the light-emitting phase T3 are adjusted so that the flicker value corresponding to the brightness of the light-emitting element C in the first light-emitting sub-phase T31 and the brightness of the light-emitting element C in any other light-emitting sub-phase T30 is smaller than or equal to the preset value.

In step S203, the durations of transmitting the light-emitting signal to the light-emitting element C by the pixel circuit PC in other light-emitting sub-phases T30 may be adjusted based on the relationship of the time lengths of the light-emitting sub-phases T30 specified by the display panel, which has been described above.

In other embodiments, in step S203, in response to a determination that it needs to adjust the durations of transmitting the light-emitting signal to the light-emitting element C by the pixel circuit PC in other light-emitting sub-phases T30 in the light-emitting phase T3, the durations of transmitting the light-emitting signal to the light-emitting element C by the pixel circuit PC in other light-emitting sub-phases T30 in the light-emitting phase T3 are adjusted so that the flicker value corresponding to the brightness of the light-emitting element C in any light-emitting sub-phase T30 and the brightness of the light-emitting element C in a reference light-emitting sub-phase T30 is smaller than or equal to the preset value. The reference light-emitting sub-phase is a light-emitting sub-phase T30 in which the light-emitting element C has the maximum brightness among the first light-emitting sub-phase T31 and a light-emitting sub-phase whose duration of transmitting the light-emitting signal to the light-emitting element C by the pixel circuit PC.

It should be noted that since the duration of transmitting the light-emitting signal to the light-emitting element by the pixel circuit in other light-emitting sub-phase in the light-emitting phase is adjusted, the time length of the light-emitting sub-phase is changed. Therefore, through adjusting the durations of transmitting the light-emitting signal to the light-emitting element C in other light-emitting sub-phases T30 according to the light-emitting sub-phase T30 with the largest brightness, the flicker value between the reference light-emitting sub-phase T30 and other light-emitting sub-phase T30 is not greater than the preset value after the adjustment.

In some embodiments of the present disclosure, the method further includes: adjusting the durations of not transmitting the light-emitting signal to the light-emitting element C by the pixel circuit PC in other light-emitting sub-phases T30 so that the duration of the light-emitting element C in any two light-emitting sub-phases T30 is smaller than or equal to the preset value.

For example, as shown in FIG. 9, through adjustment, the duration of not transmitting the light-emitting signal to the light-emitting element C by the pixel circuit PC in the fourth light-emitting sub-phase T34 is not equal to the duration of not transmitting the light-emitting signal to the light-emitting element C by the pixel circuit PC in other light-emitting sub-phase T30. For example, the duration of not transmitting the light-emitting signal to the light-emitting element C by the pixel circuit PC in the fourth light-emitting sub-phase T34 is 7.20 ms, and the duration of not transmitting the light-emitting signal to the light-emitting element C by the pixel circuit PC in other light-emitting sub-phase T30 is 7.24 ms. Accordingly, the duration of not transmitting the light-emitting signal to the light-emitting element C by the pixel circuit PC in the fourth light-emitting sub-phase T34 is the shortest one, and the time length of the fourth light-emitting sub-phase T34 is not too long. In this way the refresh ratio of the display panel is not reduced and the display effect is not affected.

Figure 11:
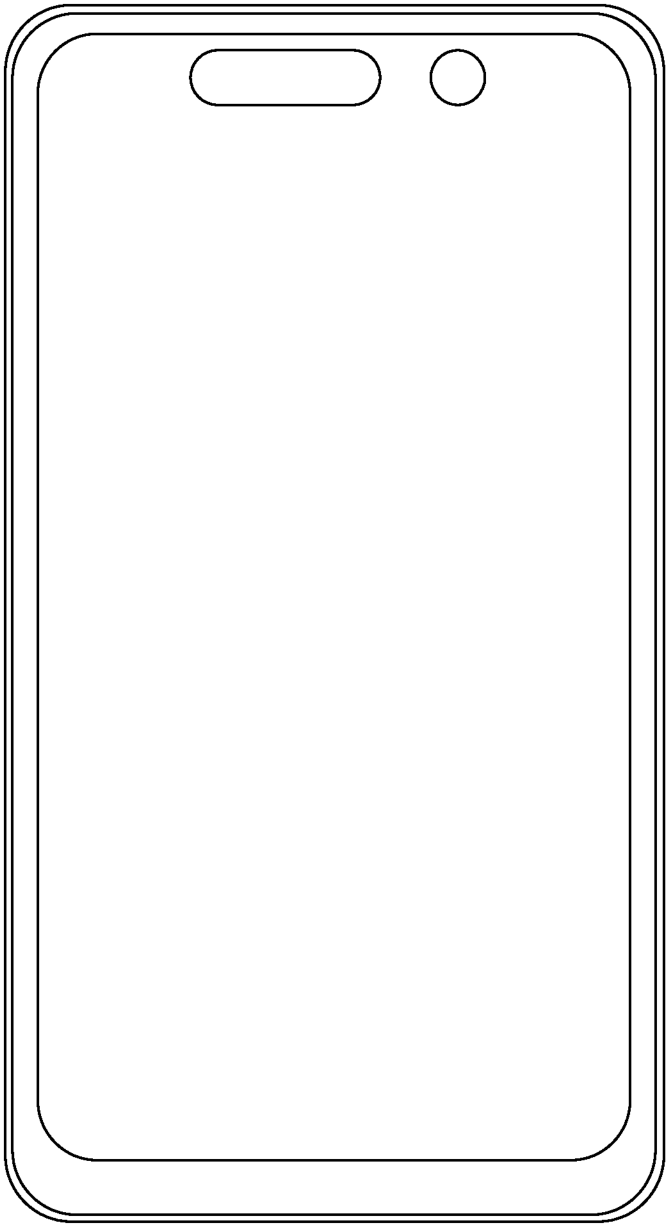
FIG. 11 is a schematic diagram of a display device according to some embodiments of the present disclosure.

FIG. 11 is a schematic diagram of a display device according to some embodiments of the present disclosure.

Embodiments of the present disclosure provide a display device. As shown in FIG. 11, the display device includes the display panel provided by any embodiment of the present disclosure. Exemplary, the display device may be a mobile phone, a computer, a smart wearable device (e.g., smart watch), a vehicle display device, and other electronic devices, which is not limited in embodiments of the present disclosure.

In the display panel of the display device provided by the present disclosure, a duration ti of transmitting the light-emitting signal to the light-emitting element C by the pixel circuit T30 in the $i^{th}$ light-emitting sub-phase is smaller than a duration tj of transmitting the light-emitting signal to the light-emitting element C by the pixel circuit PC in the $j^{th}$ light-emitting sub-phase, where $0<ti$, $0<tj$, $1 \leq i \leq n$, $1 \leq j \leq n$, and $i \neq j$. In this way, at least two light-emitting sub-phases T30 in one light-emitting sub-phase are different in light-emitting duration, the reduced brightness of some light-emitting sub-phases T30 due to the leakage current of the pixel circuit PC is compensated, the brightness difference between the light-emitting sub-phases T30 is reduced, and the flicker is reduced.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

What is claimed is:

1. A display panel, comprising:

a pixel circuit; and a light-emitting element electrically connected to the pixel circuit, wherein at least one light-emitting phase of the light-emitting element comprises n light-emitting sub-phases, and the pixel circuit is configured to transmit a light-emitting signal to the light-emitting element during the n light-emitting sub-phases, n>1; and wherein a duration ti of transmitting the light-emitting signal to the light-emitting element by the pixel circuit in an $i^{th}$ light-emitting sub-phase of the n light-emitting sub-phases is smaller than a duration tj of transmitting the light-emitting signal to the light-emitting element by the pixel circuit in a $j^{th}$ light-emitting sub-phase of the n light-emitting sub-phases, where 0<ti, 0<tj, 1≤i≤n, 1≤j≤n, and i≠j;

wherein the pixel circuit comprises a light-emitting control circuit, and the light-emitting control circuit is configured to control the pixel circuit to supply the light-emitting signal to the light-emitting element when being turned on, wherein the light-emitting control circuit is electrically connected to a first control line, and the first control line is configured to turn on the light-emitting control circuit when receiving an enable signal, and wherein a duration of supplying the enable signal by the first control line in the $i^{th}$ light-emitting sub-phase is smaller than a duration of supplying the enable signal by the first control line in the $j^{th}$ light-emitting sub-phase.

2. The display panel according to claim 1, wherein brightness of the light-emitting element in the first light-emitting sub-phase of the n light-emitting sub-phases and brightness of the light-emitting element in the $n^{th}$ light-emitting sub-phase of the n light-emitting sub-phases correspond to a flicker value smaller than or equal to −40 dB.

3. The display panel according to claim 1, wherein brightness of the light-emitting element in the first light-emitting sub-phase of the n light-emitting sub-phases and brightness of the light-emitting element in any other light-emitting sub-phase of the n light-emitting sub-phases correspond to a flicker value smaller than or equal to −40 dB.

4. The display panel according to claim 1, wherein brightness of the light-emitting element in any two light-emitting sub-phases of the n light-emitting sub-phases corresponds to a flicker value smaller than or equal to −40 dB.

5. The display panel according to claim 1, wherein a duration of transmitting the light-emitting signal to the light-emitting element by the pixel circuit in the first light-emitting sub-phase of the n light-emitting sub-phases is defined as t1, a duration of transmitting the light-emitting signal to the light-emitting element by the pixel circuit in the $n^{th}$ light-emitting sub-phase of the n light-emitting sub-phases is defined as tn, where Δt=|t1−tn|, Δt is greater than or equal to a difference between durations of transmitting the light-emitting signal to the light-emitting element by the pixel circuit in any two light-emitting sub-phases of the n light-emitting sub-phases.

6. The display panel according to claim 1, wherein a duration of transmitting the light-emitting signal to the light-emitting element by the pixel circuit in the first light-emitting sub-phase of the n light-emitting sub-phases is smaller than or equal to a duration of transmitting the light-emitting signal to the light-emitting element by the pixel circuit in another light-emitting sub-phase of the n light-emitting sub-phases.

7. The display panel according to claim 1, wherein a duration of transmitting the light-emitting signal to the light-emitting element by the pixel circuit in the $n^{th}$ light-emitting sub-phase of the n light-emitting sub-phases is greater than or equal to a duration of transmitting the light-emitting signal to the light-emitting element by the pixel circuit in another light-emitting sub-phase of the n light-emitting sub-phases.

8. The display panel according to claim 1, wherein durations of transmitting the light-emitting signal to the light-emitting element by the pixel circuit in any two of the n light-emitting sub-phases are different from one another.

9. The display panel according to claim 8, wherein a difference between the durations of transmitting the light-emitting signal to the light-emitting element by the pixel circuit in any two adjacent light-emitting sub-phases of the n light-emitting sub-phases is defined as Δt', wherein Δt' is a preset value.

10. The display panel according to claim 1, wherein durations of transmitting the light-emitting signal to the light-emitting element by the pixel circuit in at least two light-emitting sub-phases of the n light-emitting sub-phases are equal to one another.

11. The display panel according to claim 10, wherein the at least two light-emitting sub-phases are adjacent light-emitting sub-phases in the n light-emitting sub-phases.

12. The display panel according to claim 1, wherein from the second light-emitting sub-phase to the $n^{th}$ light-emitting sub-phase, the durations of not transmitting the light-emitting signal to the light-emitting element by the pixel circuit are the same.

13. The display panel according to claim 1, wherein in at least two light-emitting sub-phases from the second light-emitting sub-phase to the $n^{th}$ light-emitting sub-phase, durations of not transmitting the light-emitting signal to the light-emitting element by the pixel circuit are different.

14. The display panel according to claim 13, wherein durations of any two light-emitting sub-phases from the second light-emitting sub-phase to the $n^{th}$ light-emitting sub-phase are equal to each other.

15. A method for driving a display panel, the display panel comprising:

a pixel circuit; and a light-emitting element electrically connected to the pixel circuit, wherein at least one light-emitting phase of the light-emitting element comprises n light-emitting sub-phases, and the pixel circuit is configured to transmit a light-emitting signal to the light-emitting element during the n light-emitting sub-phases, n>1; and wherein a duration ti of transmitting the light-emitting signal to the light-emitting element by the pixel circuit in an $i^{th}$ light-emitting sub-phase of the n light-emitting sub-phases is smaller than a duration tj of transmitting the light-emitting signal to the light-emitting element by the pixel circuit in a $j^{th}$ light-emitting sub-phase of the n light-emitting sub-phases, where 0<ti, 0<tj, 1≤i≤n, 1≤j≤n, and i≠j, the method comprising:

acquiring a target display mode of the display panel;

determining, according to the target display mode, a total duration of transmitting a light-emitting signal to the light-emitting element by the pixel circuit in a light-emitting phase and a number of light-emitting sub-phases in the light-emitting phase;

determining an average duration of transmitting the light-emitting signal to the light-emitting element by the pixel circuit in all light-emitting sub-phases of the light-emitting phase according to a ratio of the total duration of transmitting the light-emitting signal to the light-emitting element by the pixel circuit in the light-emitting phase to the number of the light-emitting sub-phases in the light-emitting phase; and maintaining the duration of transmitting the light-emitting signal to the light-emitting element by the pixel circuit in the first light-emitting sub-phase of the light-emitting sub-phases unchanged, and adjusting the durations of transmitting the light-emitting signal to the light-emitting element by the pixel circuit in other light-emitting sub-phases so that brightness of the light-emitting element in any two light-emitting sub-phases of the light-emitting sub-phases corresponds to a flicker value smaller than or equal to a preset value.

16. The method according to claim 15, wherein the adjusting the durations of transmitting the light-emitting signal to the light-emitting element by the pixel circuit in other light-emitting sub-phases so that brightness of the light-emitting element in any two light-emitting sub-phases of the light-emitting sub-phases corresponds to a flicker value smaller than or equal to the preset value comprises:

adjusting the duration of transmitting the light-emitting signal to the light-emitting element by the pixel circuit in the last light-emitting sub-phase of the light-emitting sub-phases so that the flicker value corresponding to brightness of the light-emitting element in the first light-emitting sub-phase and brightness of the light-emitting element in the last light-emitting sub-phase is smaller than or equal to the preset value;

determining whether adjusting the durations of transmitting the light-emitting signal to the light-emitting element by the pixel circuit in other light-emitting sub-phases in the light-emitting phase is required according to the brightness of the light-emitting element in the first light-emitting sub-phase, the brightness of the light-emitting element in the last light-emitting sub-phase, and the brightness of the light-emitting element in other light-emitting sub-phases of the light-emitting sub-phases in the light-emitting phase; and adjusting the durations of transmitting the light-emitting signal to the light-emitting element by the pixel circuit in other light-emitting sub-phases in the light-emitting phase when adjusting the durations the pixel circuit transmits the light-emitting signal to the light-emitting element in other light-emitting sub-phases in the light-emitting phase is required, so that the flicker value corresponding to the brightness of the light-emitting element in the first light-emitting sub-phase and the brightness of the light-emitting element in any light-emitting sub-phase other than the first light-emitting sub-phase is smaller than or equal to the preset value.

17. The method according to claim 15, wherein the adjusting the durations of transmitting the light-emitting signal to the light-emitting element by the pixel circuit in other light-emitting sub-phases so that brightness of the light-emitting element in any two light-emitting sub-phases of the light-emitting sub-phases corresponds to a flicker value smaller than or equal to the preset value comprises:

adjusting the duration of transmitting the light-emitting signal to the light-emitting element by the pixel circuit in the last light-emitting sub-phase of the light-emitting sub-phases so that the flicker value corresponding to brightness of the light-emitting element in the first light-emitting sub-phase and brightness of the light-emitting element in the last light-emitting sub-phase is smaller than or equal to the preset value;

determining whether adjusting the durations of transmitting the light-emitting signal to the light-emitting element by the pixel circuit in other light-emitting sub-phases in the light-emitting phase is required according to the brightness of the light-emitting element in the first light-emitting sub-phase, the brightness of the light-emitting element in the last light-emitting sub-phase, and the brightness of the light-emitting element in other light-emitting sub-phases of the light-emitting sub-phases in the light-emitting phase; and adjusting the durations of transmitting the light-emitting signal to the light-emitting element by the pixel circuit in other light-emitting sub-phases in the light-emitting phase when adjusting the durations the pixel circuit transmits the light-emitting signal to the light-emitting element in other light-emitting sub-phases in the light-emitting phase is required, so that the flicker value corresponding to the brightness of the light-emitting element in any light-emitting sub-phase and the brightness of the light-emitting element in a reference light-emitting sub-phase is smaller than or equal to the preset value, wherein the reference light-emitting sub-phase is a light-emitting sub-phase having a maximum brightness among the first light-emitting sub-phase and a light-emitting sub-phase whose duration of transmitting the light-emitting signal to the light-emitting element by the pixel circuit has been adjusted.

18. A display device, comprising a display panel, wherein the display panel comprises:

a pixel circuit; and a light-emitting element electrically connected to the pixel circuit, wherein at least one light-emitting phase of the light-emitting element comprises n light-emitting sub-phases, and the pixel circuit is configured to transmit a light-emitting signal to the light-emitting element during the n light-emitting sub-phases, $n>1$;

wherein a duration ti of transmitting the light-emitting signal to the light-emitting element by the pixel circuit in an $i^{th}$ light-emitting sub-phase of the n light-emitting sub-phases is smaller than a duration tj of transmitting the light-emitting signal to the light-emitting element by the pixel circuit in a $j^{th}$ light-emitting sub-phase of the n light-emitting sub-phases, where $0<ti$, $0<tj$, $1 \leq i \leq n$, $1 \leq j \leq n$, and $i \neq j$;

wherein the pixel circuit comprises a light-emitting control circuit, and the light-emitting control circuit is configured to control the pixel circuit to supply the light-emitting signal to the light-emitting element when being turned on, wherein the light-emitting control circuit is electrically connected to a first control line, and the first control line is configured to turn on the light-emitting control circuit when receiving an enable signal, and wherein a duration of supplying the enable signal by the first control line in the $i^{th}$ light-emitting sub-phase is smaller than a duration of supplying the enable signal by the first control line in the $j^{th}$ light-emitting sub-phase.

* * * * *